United States Patent [19]

Satoh et al.

[11] Patent Number: 5,153,866
[45] Date of Patent: Oct. 6, 1992

[54] OPTICAL DISC RECORDING-REPRODUCING APPARATUS FOR DETERMINING THE LAST RECORDED SENSOR

[75] Inventors: Isao Satoh, Neyagawa; Noboru Yamada, Hirakata, both of Japan

[73] Assignee: Matsushita Electric Industrial Co., Ltd., Kadoma, Japan

[21] Appl. No.: 649,952

[22] Filed: Feb. 4, 1991

[30] Foreign Application Priority Data

Feb. 23, 1990 [JP] Japan .................................. 2-43025

[51] Int. Cl.⁵ ............................................. G11B 7/00
[52] U.S. Cl. ...................................... 369/54; 369/58; 369/53; 360/49
[58] Field of Search .................. 369/53, 54, 58, 32, 369/47, 59, 48; 360/47, 49

[56] References Cited

U.S. PATENT DOCUMENTS 4,630,140  12/1986  Sugimura et al. .................... 360/49
4,841,498   6/1989  Sugimura et al. .................... 369/58

Primary Examiner—Roy N. Envall, Jr.
Assistant Examiner—P. W. Huber
Attorney, Agent, or Firm—Cushman, Darby & Cushman

[57] ABSTRACT

The method of determining the last sector containing recorded information or the last recorded sector, of a writer-once and read-many optical disc, comprises dividing tracks of a write-once and read-many optical disc into a plurality of sectors, where each sector has a data part for recording data and a sector ID part in which ID information for identifying the sector is recorded in advance. The ID information of a sector is attached to the data part of the sector and is recorded in the data part of the sector. The ID information reproduced from the data part of the sector is then compared with the ID information reproduced from the sector ID part of the sector, and when the ID information from the ID part and the data part coincide, the sector is determined to be the last recorded sector.

5 Claims, 4 Drawing Sheets

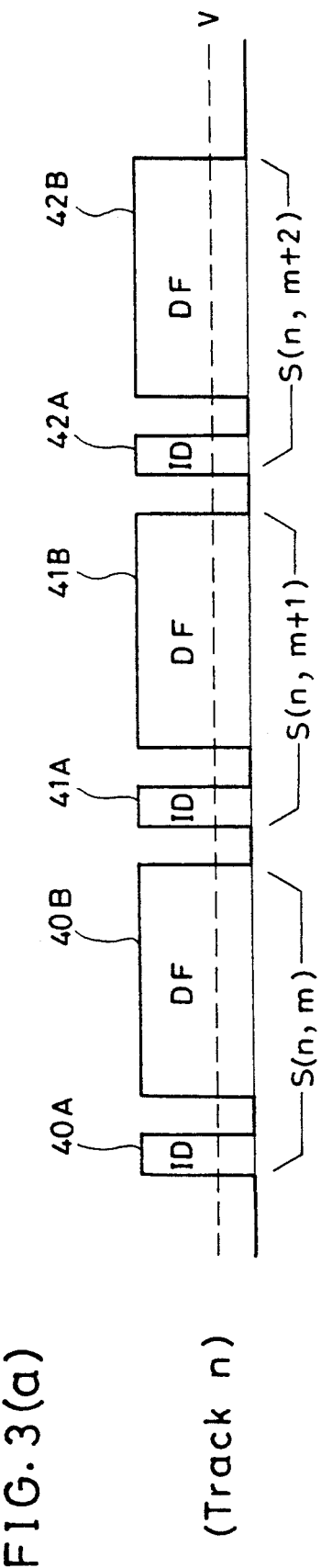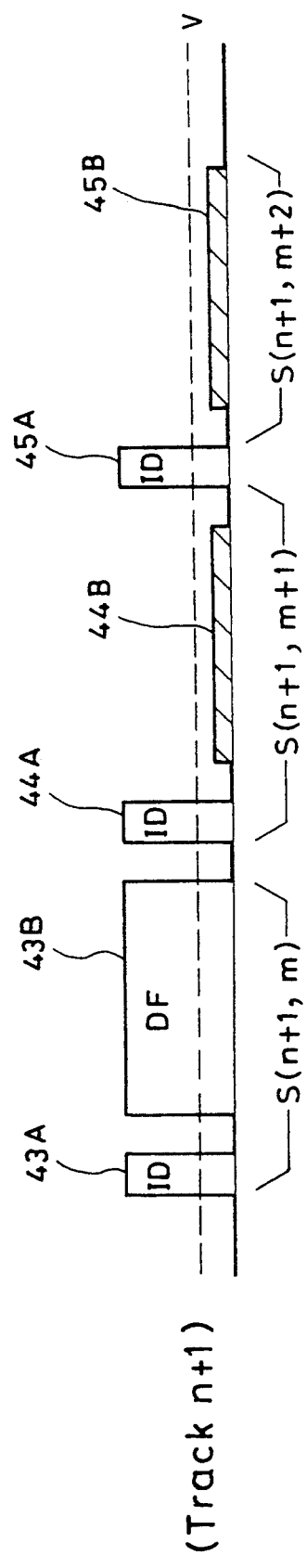

OPTICAL DISC RECORDING-REPRODUCING APPARATUS FOR DETERMINING THE LAST RECORDED SENSOR

FIELD OF THE INVENTION AND RELATED ART STATEMENT

1. Field of the Invention

The present invention relates generally to an optical disc recording-reproducing apparatus, and more particularly to an optical disc recording-reproducing apparatus for a "write-once and read-many optical disc".

2. Description of the Related Art

In an optical disc recording-reproducing apparatus for recording information in a write-once and read-many optical disc, the information is recorded in a predetermined track by a high power laser beam which is emitted from an optical head. Prior to recording of the information, a nonrecorded sector of the recording area of the optical disc must be found and is traced by the laser beam. In the write-once and read-many optical disc recording is possible only once, and it is desirable that the information is sequentially recorded in consecutive sectors from the first one to the end one of the recording area of the optical disc.

The reproduction of the information is performed by tracing the track with a laser beam of relatively low power emitted from the optical head. In the reproduction process, the last sector in which the information has been recorded must be found in order to improve a processing speed of directory management.

In order to find the sector which has been lastly recorded of the recording area two methods are known in the prior art. In one of them (first method), the entire sectors of the recording area are sequentially read out from the beginning sectors. When a sector which has no information is found, the sector which is placed immediately before the sector having no information is determined as the last recorded sector. In the other one (second method), the envelope signal of a signal recorded in a sector is detected by the optical head tracing the sector having the information. When a first sector having no envelope signal is detected, a second sector which is positioned immediately before the first sector having no envelope signal is determined to be the last recorded sector.

In the first method, after "marking" (in order to keep secret of the information recorded in a sector, a certain signal is overwritten on the sector having no-more necessary information) has been applied on a sector, the sector can not be read out because the ID data of the sector for identifying the sector has been also erased by the "marking". Consequently, the last recorded sector can not be determined.

In the second method, in the case of a high density recording optical disc, crosstalk between neighboring tracks can not be disregarded. A crosstalk signal is reproduced from a nonrecorded sector which is neighboring to the recorded sector, and thereby the last recorded sector can not be distinguished. Hence, improvement for high density recording in the optical disc is limited by the above-mentioned difficulty in the prior art.

OBJECT AND SUMMARY OF THE INVENTION

An object of the present invention is to provide an optical disc recording-reproducing apparatus which can accurately detect the last recorded sector in the recording area of a high density recording optical disc.

The optical disc recording-reproducing apparatus in accordance with the present invention comprises:

an optical head for tracing a track of an optical disc having tracks which are divided into a plurality of sectors where each sector has a data part for recording data and a sector ID part in which ID information for identifying a sector is preliminarily recorded, track search means for controlling said optical head to trace a predetermined track, first control means for attaching the ID information of said sector to the data of said sector and recording said data in said sector said recording step occurring in a predetermined consecutive order of sectors in each track from beginning to end of the optical disc, envelope detecting means for detecting an envelope signal of said sector, which has been reproduced by said optical head, second control means for reproducing a subsequent sector following said sector when an envelope signal is detected, and for reproducing a proceding sector positioned before said sector when said envelope signal is not detected, comparator means for comparing the ID information of said sector ID part with the ID information of said data part during sequential reproducing of said preceding sector positioned before said sector when no envelope signal is detected, and determination means for determining if said sector is the last recorded sector whereby the ID information of said sector ID part and the ID information of the data part of a previously reproduced sector coincide.

BRIEF DESCRIPTION OF THE DRAWINGS

FIGS. 3(a) and 3(b) are charts of the envelopes of signals reproduced from track n and track n+1 neighboring two tracks, respectively, in a low recording density optical disc;

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
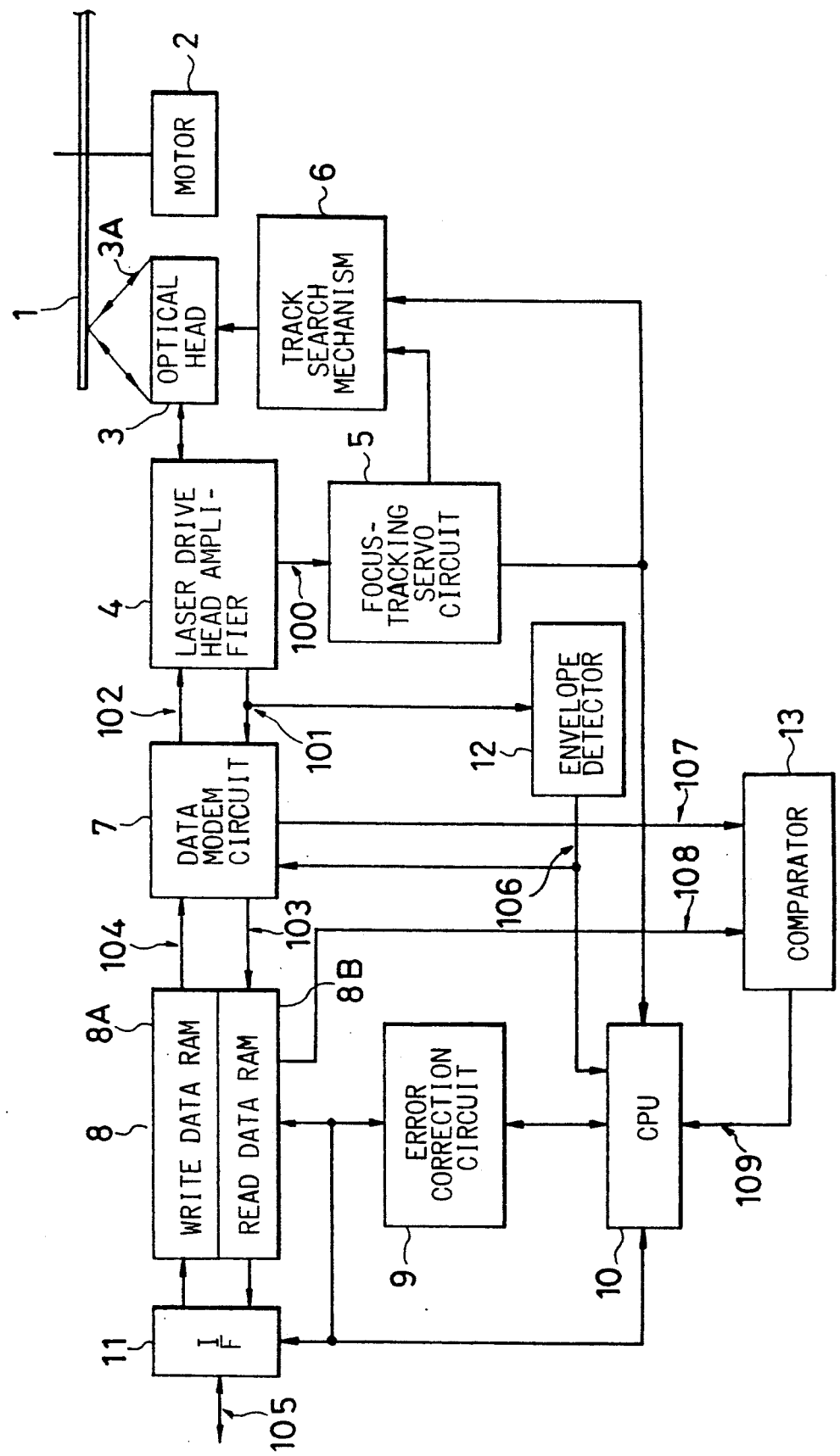
FIG. 1 is a block diagram of an embodiment of the optical disc recording-reproducing apparatus in accordance with the present invention.

FIG. 1 is a block diagram of an embodiment of the optical disc recording-reproducing apparatus for a write-once and read-many optical disc in accordance with the present invention. Referring to FIG. 1, an optical disc 1 is set on a rotary base driven by a motor 2. An optical head 3 is disposed under the optical disc 1, and a laser beam 3A emitted from the optical head 3 is applied above the optical disc 1. A laser drive head amplifier 4 amplifies the signal detected by the optical head 3 and outputs a focusing-tracking error signal 100 and a read out signal 101. The focusing-tracking error signal 100 is applied to a focusing-tracking servo circuit 5, and an output signal for controlling the optical head is output from the focusing-tracking servo circuit 5. The output signal is applied to a track search mechanism 6. The optical head 3 is controlled by the track search mechanism 6, and the laser beam emitted from the optical head 3 is focused on the surface of the optical disc 1 and is controlled to trace a predetermined track.

A data MODEM circuit 7 demodulates the amplified read out signal 101, and a read data signal 103 is output therefrom. The read data signal 103 is applied to a read data RAM 8B and is memorized therein. The data MODEM circuit 7 also modulates a write data signal 104 output from a write data RAM 8A and outputs a write signal 102 to the laser drive head amplifier 4. The write signal 102 is amplified by the laser drive head amplifier 4 and is output to the optical head 3.

An error correction circuit 9 attaches a data ID for identifying data to the write data memorized in the write data RAM 8A, and a write data signal 104 encoded with an error correction code is output from the write data RAM 8A. The data ID comprises a sector address and a track address of the sector to be recorded, and the data ID is represented by a phsical address of an absolute address or a logical address of a relative address. A CPU 10 controls the whole system of the optical disc recording-reproducing apparatus. An interface circuit 11 is for coupling the optical disc recording-reproducing apparatus to a host CPU through a data bus 105.

An envelope detector 12 detects an envelope of the read out signal 101 output from the laser drive head amplifier 4, and an envelope signal 106 is output to the CPU and the data MODEM circuit 7. In the envelope detector 12, a predetermined threshold voltage V is set to limit the level of the read out signal 101. When the level of the read out signal 101 exceeds the threshold voltage V, the envelope signal 106 is issued. An ID comparator 13 compares a reproduced sector ID signal 107 from the data MODEM circuit 7 with a data ID signal 108 from the read data RAM 8B. And in the event that the ID signal 107 and the data ID signal 108 are distinguishable from one another, the ID comparator 13 issues an ID noncoincidence signal 109 to the CPU 10. The sector ID signal 107 is reproduced from a sector ID part 30A, 31A . . . in FIG. 2(a), for example, of each sector. The sector ID signal 107 serves to identify a sector and is recorded in the sector ID parts of entire sectors of the optical disc in advance.

Operation of the above-mentioned embodiment is elucidated hereafter.

In the recording operation, the optical head 3 is driven by the track search mechanism 6, and a predetermined track is searched. Subsequently, a write data which is transmitted from the host computer and is stored in the write data RAM 8A is attached with a data ID and is encoded with an error correction code by the error correction circuit 9. Hence, a write data signal 104 is output from the write data RAM 8A. The write data signal 104 is modulated by the data MODEM circuit 7, and a write signal 102 is issued to the laser drive head amplifier 4. When a predetermined sector is detected from the sector address of a readout signal 101, the write signal 102 is recorded on the predetermined sector of the optical disc 1.

Figure 2A:
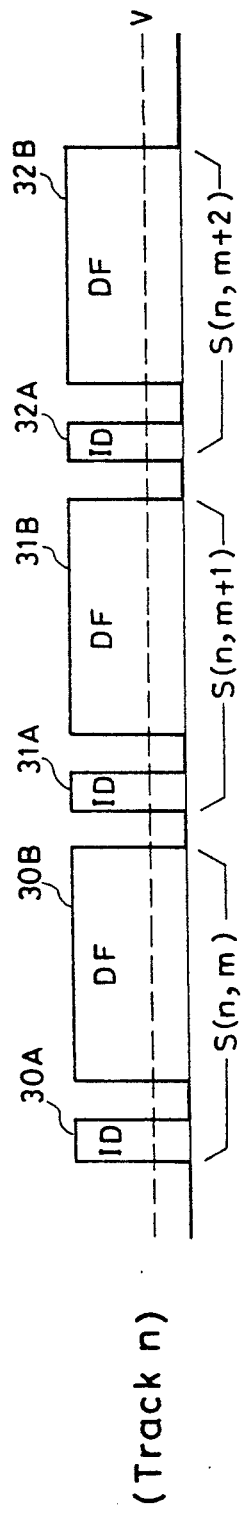
FIGS. 2(a), 2(b) and 2(c) are charts of the envelopes of signals reproduced from a track n, a track n+1 and a track n+2 of neighboring three tracks, respectively, in a high recording density optical disc.
Figure 2B:
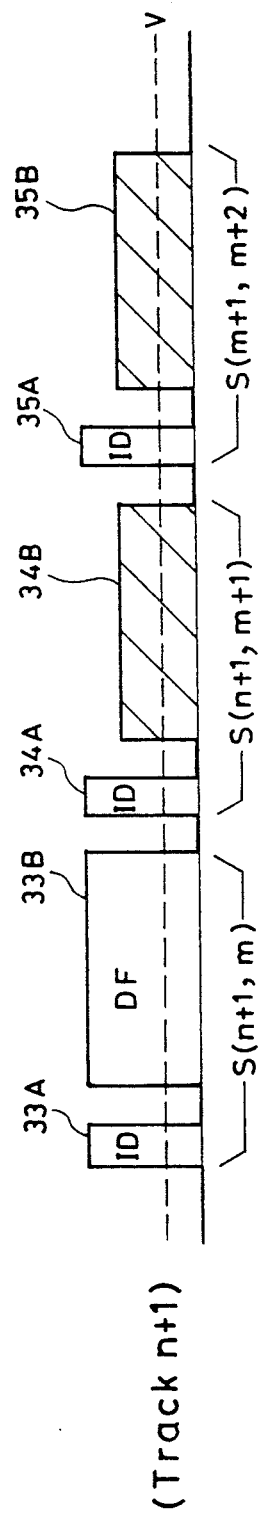
Figure 2C:
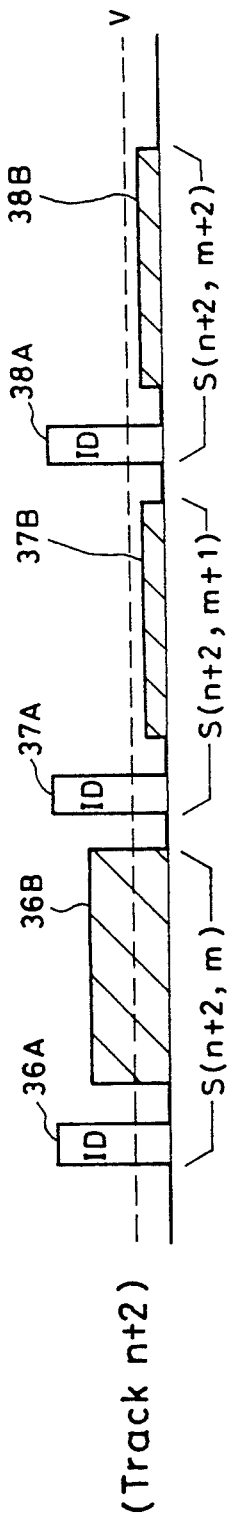

In the above-mentioned recording operation, as shown in FIG. 2(a), the data ID comprising the sector address and the track address of a sector S(n, m) is recorded in the data field 30B of the sector S(n, m) of a first track (No. n), for example. FIG. 2(b) shows a second track (No. n+1) neighboring to the first track (No. n), and FIG. 2(c) shows a third track (No. n+2) neighboring to the second track (No. n+1). In FIGS. 2(a), 2(b) and 2(c), three sectors are illustrated in each track. The sector ID parts shown by square envelopes 30A, 31A, 32A, 33A, 34A, 35A, 36A, 37A and 38A are recorded with the sector ID signals of each sector in advance. The data fields shown by square envelopes 30B, 31B, 32B and 33B are recorded with data and the data ID signals of each sector. The data fields show by square envelopes 34B, 35B, 36B, 37B and 38B are blank data fields in which no signals are recorded.

In reproducing operation, the optical head 3 is positioned on a track, and the information recorded in the sectors of the track is reproduced. A readout signal 101 is input to the data MODEM circuit 7 from the laser drive head amplifier 4. In the data MODEM circuit 7, a sector address is detected from the readout signal 101, and when a predetermined sector is detected, the read signal 101 is demodulated. The demodulated read data signal 103 is stored in the read data RAM 8B.

Subsequently, detection of the last recorded sector is elucidated hereafter.

FIGS. 2(a), 2(b) and 2(c) show neighboring three tracks (No. n), (No. n+1) and (No. n+2). The first track (No. n) has three sectors S(n, m), S(n, m+1) and S(n, m+2), the second track (No. n+1) has three sectors S(n+1, m), S(n+1, m+1) and S(n+1, m+2), and the third track (No. n+2) has three sectors S(n+2, m), S(n+2, m+1) and S(n+2, m+2). The square envelopes 30A, 31A, 32A, 33A, 34A, 35A, 36A, 37A and 38A represent reproduced signals from the sector ID part (ID), and the square envelopes 30B, 31B, 32B and 33B represent reproduced signals from the data field (DF). The square envelope 36B represents a reproduced signal of the sector S(n+2, m) of the track (No. n+2) which is reproduced by crosstalk effect by which the laser beam for reproducing the sector S(n+2, m) is affected by the sector S(n+1, m). In a similar manner, the square envelopes 34B and 37B represent signals reproduced by the crosstalk effect of the sector S(n, m+1), and square envelopes 35B and 38B represent signal S reproduced by the crosstalk effect of the sector S(n, m+2). These envelopes are detected by the envelope detecting circuit 12.

FIGS. 2(a), 2(b) and 2(c) show track arrangements in a high density recording optical disc, and two tracks are affected by the crosstalk effect. On the other hand, FIGS. 3(a) and 3(b) show track arrangements of a low density recording optical disc, neighboring one track is affected by the crosstalk effect. The configuration of the sector ID part (ID) and the data field (DF) in each sector shown in FIGS. 3(a) and 3(b) is identical with those shown in FIGS. 2(a), 2(b) and 2(c).

Figure 4:
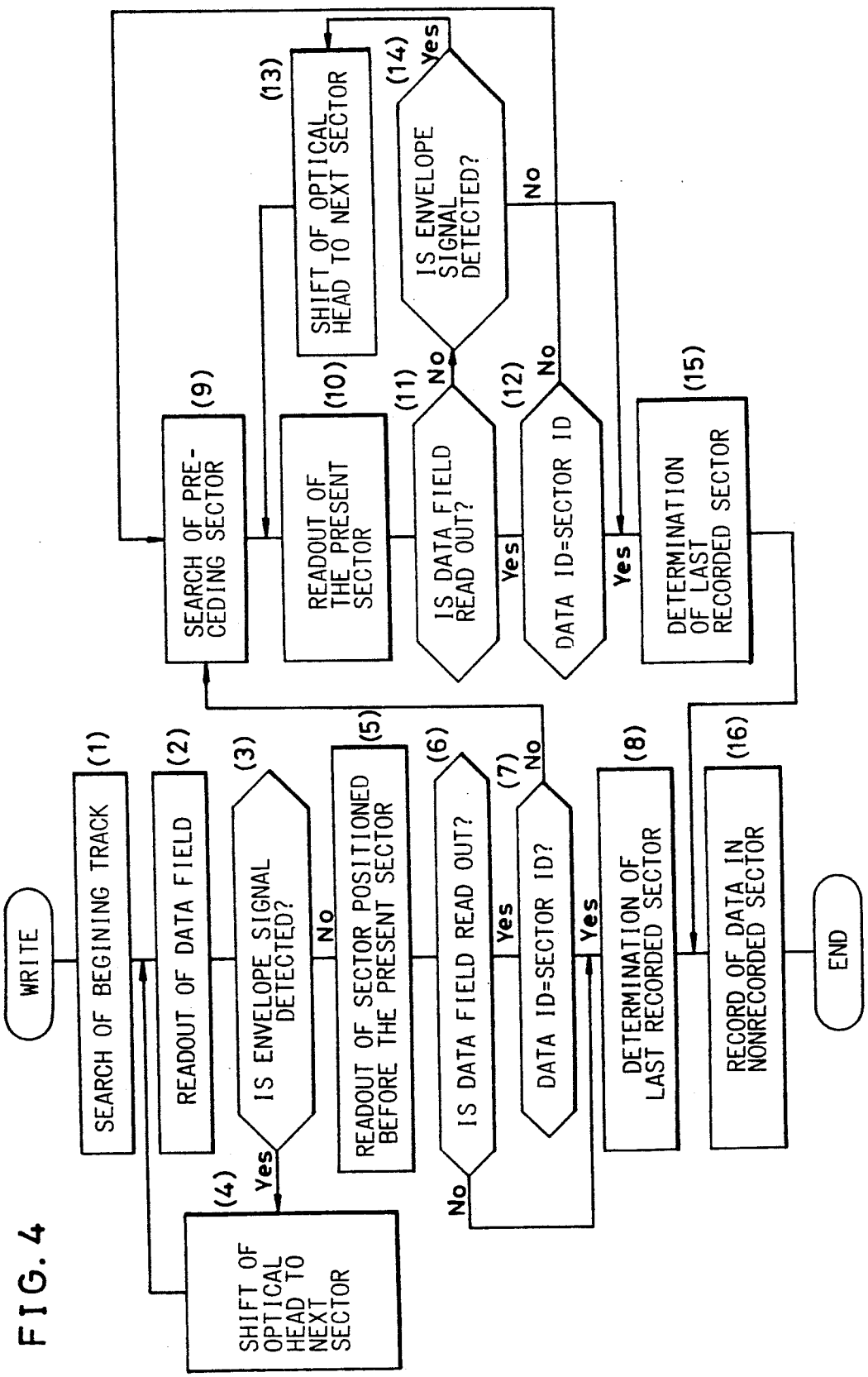
FIG. 4 is a flow chart of operation of the preferred embodiment.

Detection of the last recorded sector is elucidated with reference to FIG. 4. Entire tracks of the optical disc are traced by the optical head 3 from beginning to end of the recording area and the beginning sector is searched (step 1), and the sectors in each track are reproduced thereby. Referring to FIGS. 2(a) and 2(b), first the optical head 3 traces the first track (No. n), and subsequently traces the second track (No. n+1). In each track, the optical head 3 traces the sectors from left to right in FIGS. 2(a), 2(b) and 2(c). In each sector, the data field (DF) is read out (step 2), and when the envelope signal of the data field (DF) is detected (step 3), the optical head 3 is shifted to the subsequent sector (step 4).

When the envelope signal of the data field (DF) is not detected, the sector which is positioned immediately before the present sector is read out (step 5). When the data field (DF) is reproduced (Step 6), the sector address in the sector ID part (ID) is compared with the sector address recorded in the data field (DF) (step 7). When both the sector addresses coincide, the subsequent sector is determined to be a nonrecorded sector (step 8).

When the optical head 3 arrives at the sector S(n+1, m+1) of the second track (No. n+1), the sector address of the data field (DF) shown by the envelope 34B and the sector address of the data ID shown by the envelope 34A do not coincide (step 7). This is because the sector address which is included in the data field DF shown by the envelope 34B is identical with the sector address which is included in the data field DF shown by the envelope 31B. Consequently, the sector S(n+1, m) which is placed before the sector S(n+1, m+1) is searched and determined to be the last recorded sector (step 9).

Then the data field (DF) of the sector S(n+1, m) is read out (step 10). When the data field is reproduced (step 11), the sector address in the sector ID part (ID) is compared with the sector address recorded in the data field (DF) (step 12). When both the sector addresses coincide, the flow advances to step 15. When both the sector addresses are not in coincidence, the flow returns to step 9.

When the data field (DF) is not read out (step 11), the envelope signal is detected in step 14. When the envelope signal is detected, the flow goes on to step 13. When the envelope signal is not detected, the flow advances to step 15.

At both step 8 and step 15, a nonrecorded sector is determined. Then, the data can be recorded in the nonrecorded sector (step 16).

There is another method that in FIGS. 2(a), 2(b) and 2(c), first, the sector S(n+2, m+1) which is lower than a predetermined threshold voltage V in a reproduced signal level of the data field (DF) is detected, and then the sector S(n+1, m), which is placed immediately before the sector S(n+1, m+1) and corresponding to the sector S(n+2, m+1) of the prior track (No. n+1) with respect to the track (No. n+2), is determined to be the last recorded sector.

Referring to FIGS. 3(a) and 3(b), in the low density recording optical disc, the signal level which is recorded by the crosstalk is reduced because of the large track interval. Consequently, the reproduced signal level is reduced as shown by the square envelopes 44B and 45B. When the reproduced signal level is lower than the threshold voltage V, the sector address is liable to be incorrectly detected. In this case, the sector S(n+2, m+1) which gives lower reproduced signal level than that of the threshold voltage V is detected, and the sector S(n+1, m) which is placed immediately before the sector S(n+2, m+1) is determined to be the last recorded sector. By mean of the above-mentioned two methods, the last recorded sector is detectable in both the high density recording optical disc and low density recording optical disc.

The above-mentioned operation is controlled by the CPU 10 of the optical disc recording-reproducing apparatus shown in FIG. 1.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An optical disc recording-reproducing apparatus comprising:
   an optical head for tracing a track of an optical disc having tracks which are divided into a plurality of sectors where each sector has a data part for recording data and a sector ID part in which ID information for identifying respective sectors is preliminarily recorded,
   track search means for controlling said optical head to trace a predetermined track,
   first control means for attaching ID information of respective sectors to the data of said respective sectors and recording said data in said respective sectors according to a predetermined consecutive order of said plurality of sectors in each track from beginning to end of said optical disc,
   envelope detecting means for detecting, within said respective sectors, envelope signals reproduced by said optical head,
   second control means for reproducing subsequent second sectors following said respective sectors when envelope signals are therein detected, and for reproducing preceding third sectors positioned before said respective sectors when said envelope signals are not therein detected,
   comparator means for comparing ID information of said sector ID part with ID information of said data part during sequential reproducing of said preceding third sectors positioned before respective sectors in which no envelope signals are detected, and
   determination means for determining if said respective sectors are the last recorded sector whereby said ID information of said sector ID part and said ID information of said data part coincide with those of a previously reproduced sector.

2. An optical disc recording-reproducing apparatus in accordance with claim 1, wherein detection of said envelope signal is determined in the event that said envelope signal exceeds a predetermined threshold level.

3. An optical disc recording-reproducing method comprising the steps of:
   tracing a track of an optical disc having tracks which are divided into a plurality of sectors where each sector has a sector ID part, having a preliminarily recorded ID information for identifying respective sectors, and a data part for recording data,
   controlling said optical head to trace a predetermined track,
   attaching ID information of respective sectors to said data of said respective sectors and recording said data in said respective sectors according to a predetermined order of said plurality of sectors in each track from beginning to end of the optical disc,
   detecting, within said respective sectors, envelope signals which are reproduced by said optical head,
   reproducing subsequent second sectors following said respective sectors when envelope signals are detected, and reproducing preceding third sectors positioned before said respective sectors when said envelope signals are not detected,
   comparing ID information of said sector ID part with ID information of said data part during sequential reproducing of said preceding third sectors positioned before respective sectors in which no envelope signals are detected, and determining if said respective sectors are the last recorded sector whereby ID information of said sector ID part and ID information of said data part coincide with those of a previously reproduced sector.

4. Optical disc recording-reproducing method in accordance with claim 3, wherein when no envelope signal of the data part of a first sector is detected, a third sector positioned immediately before a second sector which belongs to a second track positioned before a first track having said first sector and is positioned corresponding to said first sector is determined to be the last recorded sector.

5. A method for reproducing an optical disc, wherein said optical disc comprises a sector ID part, having preliminarily recorded ID information for identifying respective sectors, and a data part for recording data and said ID information, said method comprising the steps of:

detecting, within said respective sectors, envelope signals which are reproduced by said optical head, reproducing subsequent second sectors following said respective sectors when envelope signals are detected, and reproducing preceding third sectors positioned before said respective sectors when said envelope signals are not detected, comparing ID information of said sector ID part with ID information of said data part during sequential reproducing of said preceding third sectors positioned before said respective sectors in which no envelope signals are detected, and determining if said respective sectors are the last recorded sector whereby ID information of said sector ID part and ID information of said data part coincide with those of a previously reproduced sector.

* * * * *